United States Patent [19]
Murakami et al.

[11] Patent Number: 5,896,778
[45] Date of Patent: Apr. 27, 1999

[54] OPERATING LEVER DEVICE FOR MANUAL TRANSMISSIONS FOR MOTOR VEHICLES

[75] Inventors: Takao Murakami, Hamamatsu; Yoshimasa Kataumi, Fukaya, both of Japan

[73] Assignee: Fuji Kiko Co., Ltd, Tokyo, Japan

[21] Appl. No.: 08/807,521

[22] Filed: Feb. 27, 1997

[30] Foreign Application Priority Data

Feb. 29, 1996 [JP] Japan ................................ 8-042366
Feb. 29, 1996 [JP] Japan ................................ 8-042367

[51] Int. Cl.⁶ ........................................................ B60K 20/04
[52] U.S. Cl. ...................................... 74/473.34; 74/473.25
[58] Field of Search ........................... 74/473.25, 473.34, 74/473.1, 469, 471 R

[56] References Cited

U.S. PATENT DOCUMENTS

| | | | |
|---|---|---|---|
| 4,693,135 | 9/1987 | LaRocca et al. ..................... | 74/473 R |
| 4,873,884 | 10/1989 | Yamada et al. ...................... | 74/473 |
| 5,024,117 | 6/1991 | Yamada ................................ | 74/473 P |
| 5,025,677 | 6/1991 | Müller et al. ....................... | 74/473 R |
| 5,540,114 | 7/1996 | Kim .................................... | 74/475 |
| 5,626,057 | 5/1997 | Nishigai et al. ..................... | 74/473 P |

FOREIGN PATENT DOCUMENTS 0 560 645   9/1993   European Pat. Off. .
38 29 559   4/1989   Germany .

Primary Examiner—Charles A Marmor
Assistant Examiner—David Fenstermacher
Attorney, Agent, or Firm—Foley & Lardner

[57] ABSTRACT

An operating lever device for manual transmissions of motor vehicles includes a shift lever and a select lever connectable to a manual transmission through a shift cable and a select cable. Each lever is swingably supported to a support casing, and each cable has an end with a mounting member connected. The mounting member is slid on a slope of the casing to engage with each lever.

13 Claims, 16 Drawing Sheets

OPERATING LEVER DEVICE FOR MANUAL TRANSMISSIONS FOR MOTOR VEHICLES

BACKGROUND OF THE INVENTION

The present invention relates to an operating lever device of manual transmissions for motor vehicles.

Generally, a manual transmission is disposed in an engine room located in a front portion of a motor vehicle, whereas an operating lever comprising a shift lever and a select lever is disposed in the interior of the motor vehicle for receiving a driver. The manual transmission and the operating lever are connected to each other with a shift cable or rod and a select cable or rod to transmit movement of the shift lever to the manual transmission, obtaining shift operation.

For coupling of the operating lever with the shift cable and the select cable, the shift lever and a cross lever perpendicularly mounted thereto have an end formed with a spherical protrusion. On the other hand, the shift cable and the select cable have an end to which a mounting member with a spherical recess, which is engaged with the spherical protrusion, is connected.

However, in view of possible disengagement of the spherical protrusion of each of the shift lever and the cross lever from the spherical recess of each of the shift cable and the select cable, the spherical recess has a depth that enables engagement of substantially half or more of the spherical protrusion, which needs a time-consuming work with special tools, resulting in lowered working efficiency.

On the other hand, coupling of the operating lever with the shift cable and the select cable can be carried out by pins arranged through ring-shaped mounting members connected to the shift cable and the select cable. However, each pin needs an anti-loosening member for preventing disengagement of the pin, resulting in troublesome work and increasing the manufacturing cost due to increased number of parts.

It is, therefore, an object of the present invention to provide an operating lever device for manual transmissions of motor vehicles that can be mounted without any time-consuming work and with improved working efficiency.

SUMMARY OF THE INVENTION

An operating lever device for a manual transmission of a motor vehicle according to the present comprises a case, a lever, a mounting member, and a block. The casing is adapted to be fixed to the body of the vehicle. The lever is swingably supported to the casing and is adapted for connection to the manual transmission. The lever has a lower end, which is engageable with the mounting member. The block is positioned within the casing and has a sloped section and a linear member formed with the sloped section. The linear member is engageable with the mounting member to linearly guide the mounting member.

The lever includes a shift lever and a select lever. The sloped section is adapted to be inclined in a fore and aft direction of the vehicle. The sloped section can be formed with an inner bottom face of the casing and can be formed at one side of the casing. The linear member can be a guide rail. The mounting member includes a guide portion engaged with the guide rail.

The select lever can have its lower end formed with a bracket and the bracket can have an end formed with a hole. The shift lever has the lower end formed with a bracket having an end formed with a hole. The mounting member can include a shaft engaged with the bracket hole.

The operating lever can further include a spherical portion, a bearing portion, a first bearing, a second bearing, and a cross lever. The spherical portion can be formed on the shift lever. The bearing portion can be mounted to the casing and can have a side formed with a recess. The first bearing, which can be engaged with the bearing portion, serves to rotatably support the spherical portion of the shift lever. The first bearing can have a side formed with a recess. The second bearing, which can be mounted to the bearing portion, serves to rotatably press the spherical portion of the shift lever. The second bearing can have a side formed with a recess. The recesses of the bearing portion, the first bearing, and the second bearing are complementary to each other. The cross lever, which can be mounted to the shift lever, extends through the recesses of the first and second bearings, and engages the select lever. The bearing portion has a protrusion formed on an outer peripheral face thereof and the second bearing includes inner and outer cylindrical portions, the inner cylindrical portion has a curved inner edge formed with circumferential divisions that contact an upper part of the spherical portion of the shift lever. The outer cylindrical portion is formed with a recess engaging the protrusion. The first and second bearings can include radial protrusions arranged on side walls of the recesses. The radial protrusions engages the recess of the bearing portion.

DETAILED DESCRIPTION OF THE INVENTION

Figure 1:
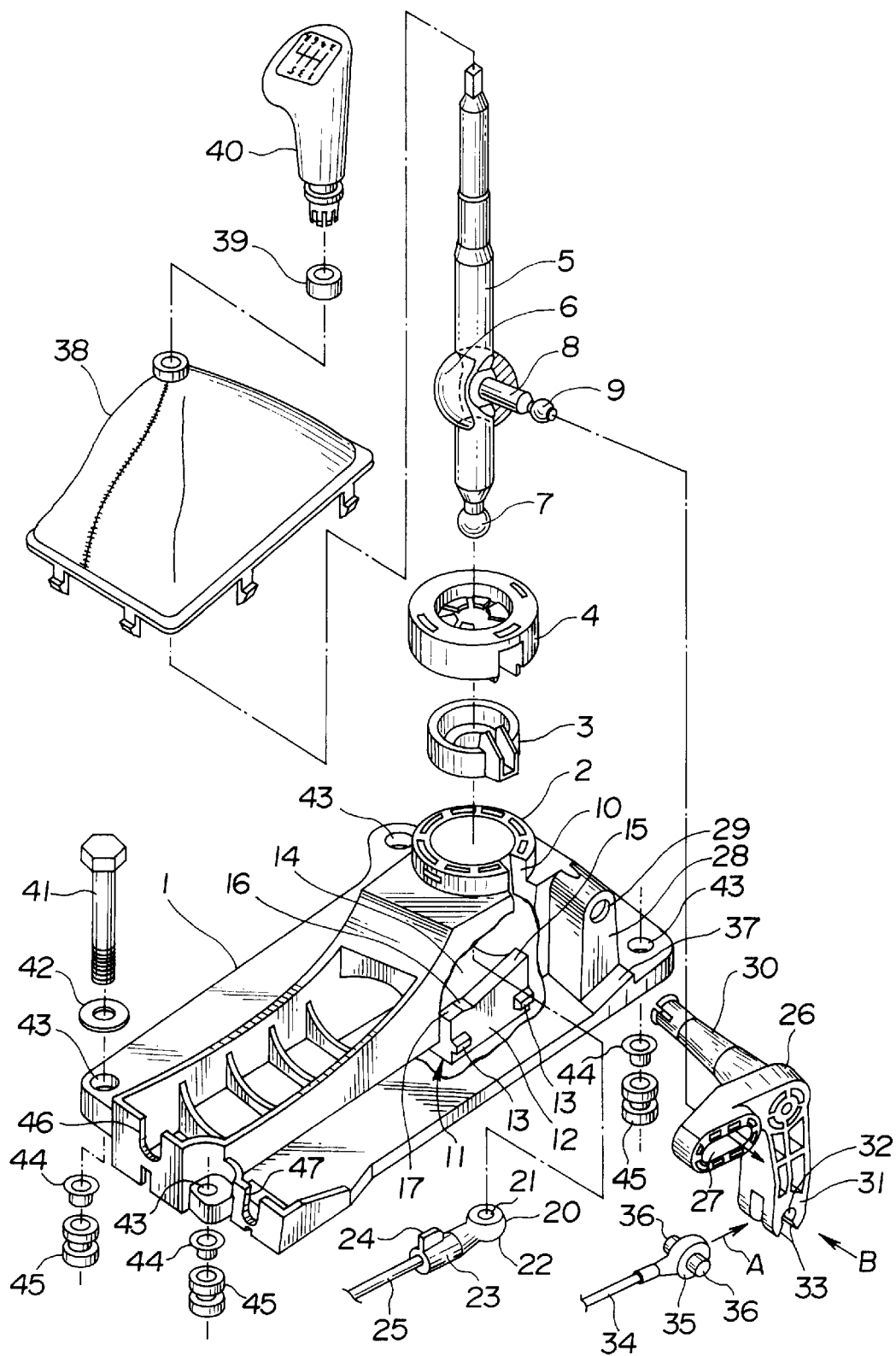
FIG. 1 is an exploded perspective view showing a first embodiment of an operating lever device for manual transmissions for motor vehicles.

Referring to the drawings, a description will be made with regard to preferred embodiments of an operating lever device for manual transmissions for motor vehicles.

FIGS. 1–6 show a first embodiment of the present invention. Referring to FIG. 1, an operating lever comprising a shift lever 5 and a bell crank 26, which serves as a select lever is swingably supported to a support casing 1, which is adapted to be fixed to a vehicle body. The shift lever 5 comprises a spherical portion 6 supported to a bearing 2 of the support casing 1 through a lower bearing 3 and an upper bearing 4 so as to be swingable in the fore and aft direction. The shift lever 5 has a lower end formed with a spherical protrusion 7. A cross lever 8 is perpendicularly mounted to the shift lever 5 to protrude from the spherical portion 6. The cross lever 8 protrudes from an opening 10 of the bearing 2 of the support casing 1, and has an end formed with a spherical protrusion 9.

Figure 2:
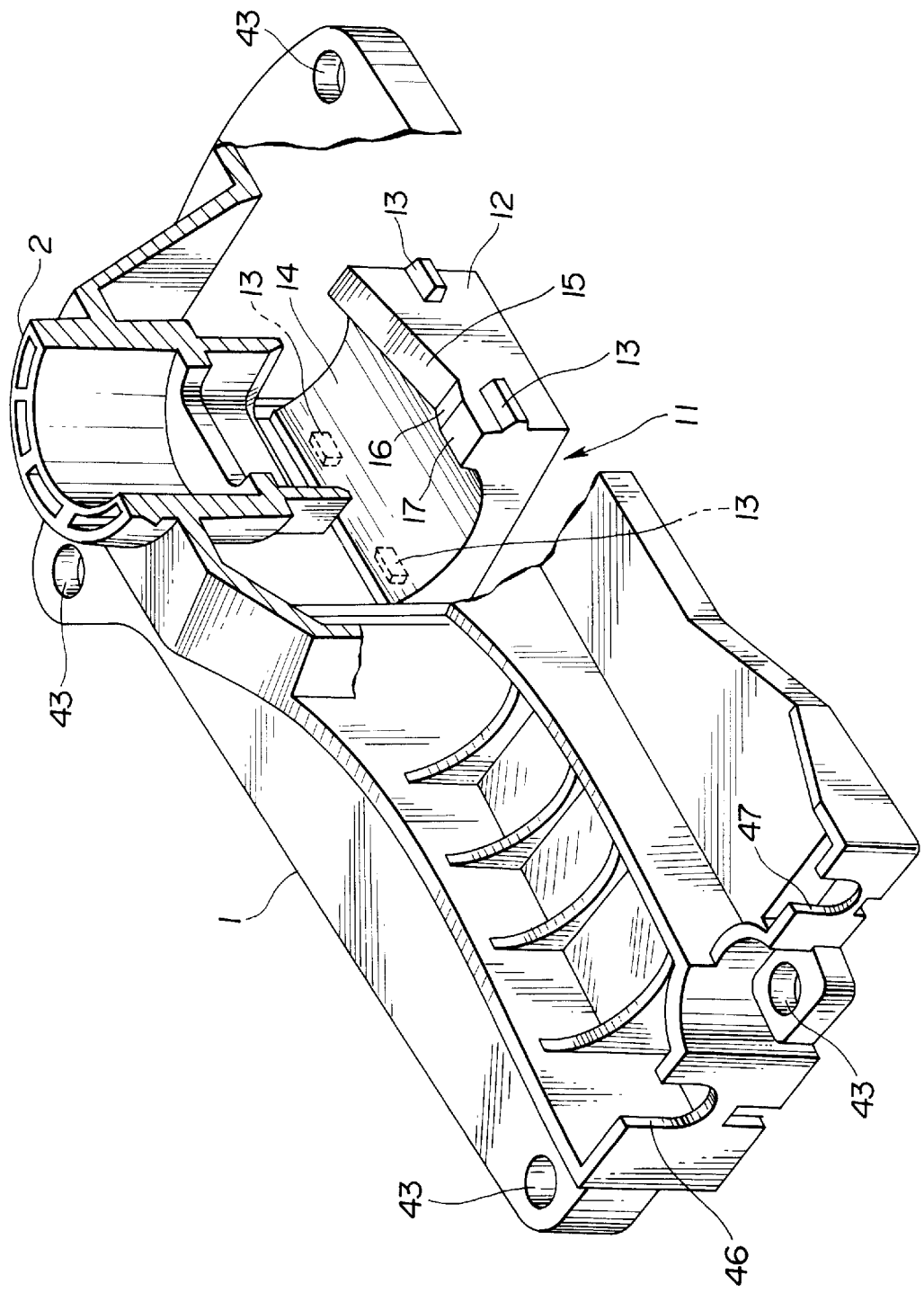
FIG. 2 is a partly broken perspective view showing a support casing.

Referring to FIG. 2, the support casing 1 has, just under the shift lever 5, a bottom portion formed with an opening 11 with which a block 12 is engaged. Formed to the block 12 on the side thereof is a protrusion 13 engaged with a hole, not shown, formed with the inner peripheral face of the support casing 1. The top face of the block 12 forms a curved inner bottom face 14 on which the spherical protrusion 7 is swingingly moved. The inner bottom face 14 has one side corresponding to the left side of the vehicle body, formed with a slope 15, which is higher than the inner bottom face 14 and has a higher end on the rear side of the vehicle body. Formed in front of the slope 15 are an inclined plane 16 having a higher end on the front side of the vehicle body and a horizontal plane 17 extending therefrom to the front side of the vehicle body.

Figure 3A:
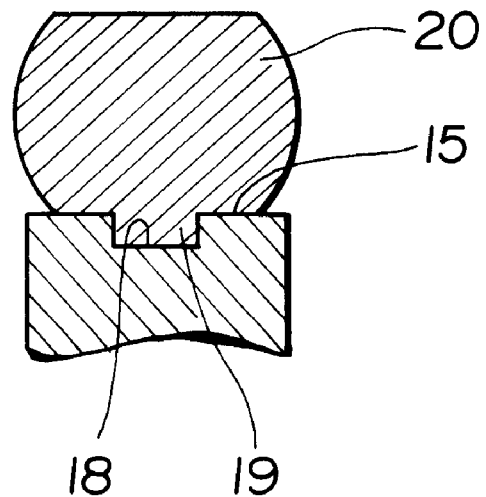
FIGS. 3A and 3B are cross sections, each showing a shift-cable mounting member disposed on a slope.
Figure 3B:
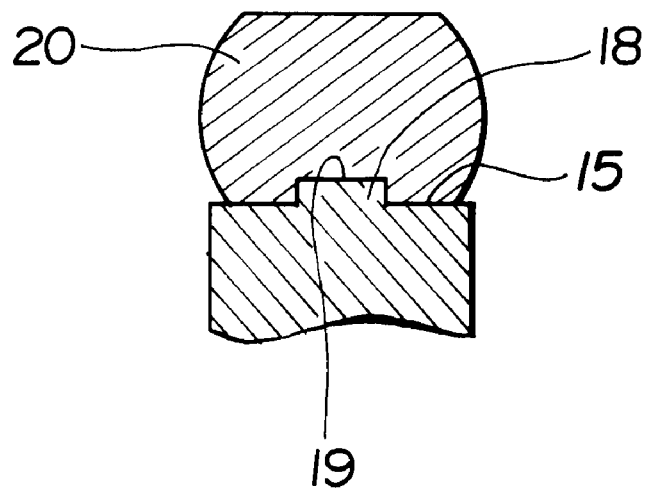

The slope 15 is formed so that, when the shift lever 5 is inclined to the rear side of the vehicle body, then to the right as viewed in FIG. 1, the spherical protrusion 7 is positioned at the initial end of the slope 15, and that, if the shift lever 5 is inclined to the rear side of the vehicle body in that position, the spherical protrusion 7 does not contact the slope 15, i.e., a given clearance maintained. The top face of the slope 15 is flat, and may be formed with a guide rail 18 extending longitudinally. The guide rail 18 can be formed of a recessed section as shown in FIG. 3A, or a protruded section as shown in FIG. 3B. The guide rail 18 serves to guide a shift-cable mounting member 20 as will be described later when being slid on the slope 15. On the other hand, the shift-cable mounting member 20 has a bottom face 22 formed with a complimentary protruded or recessed guide portion 19.

The shift-cable mounting member 20 engaged with the spherical protrusion 7 is shaped like a cup, having the top face formed with a spherical recess 21 and the bottom face formed with a flat plane 22 that slides on the slope 15. The spherical recess 21, that is flexible, has a depth that enables engagement of substantially half or more of the spherical protrusion 7 to prevent easy release of the two engaged members, and allow rotation of the spherical protrusion 7 in the spherical recess 21. A wire end 23 is connected to the shift-cable mounting member 20 to be rotatable about an axis thereof, and is formed with a lug 24. The shift cable 25 is connected to the wire end 23.

The cross lever 8 of the shift lever 5 outwardly protrudes from the opening 10 of the bearing 2 of the support casing 1, so that the spherical protrusion 9 is engaged with a long hole 27 formed through the bell crank 26 at one end thereof.

The bell crank 26 comprises a shaft 30 arranged through a hole 29 of a support portion 28 located in the vicinity of the opening 10 to be rotatably supported thereto. Formed to the bell crank 26 at the lower end thereof is a bracket 31 having C-shape as viewed from an arrow A in FIG. 1. The bracket 31 is formed with a center hole 32, and an angular indentation 33 thereunder having a substantially wedge shape as viewed from an arrow B in FIG. 1.

A select cable 34 has an end to be connected to the bell crank 26, to which a select-cable mounting member 35 is arranged. A shaft 36 is arranged through the select-cable mounting member 35 in the center thereof to protrude in the cross direction. The shaft 36, which is inserted in the center hole 32 from the angular indentation 33, is rotatably supported to the bracket 31.

A slope 37 is formed to the support casing 1 at the side thereof so that an end on the rear side of the vehicle body is high enough to allow the lower end of the bell crank 26 to be engageable with the select-cable mounting member 35. The slope 37 serves to prevent the bell crank 26 from contacting the select-cable mounting member 35 after the lower end of the bell crank 26 is engaged with the select-cable mounting member 35. Referring to FIGS. 3A and 3B, in the same way as the slope 15, the top face of the slope 37 may be formed with a guide rail 18 with which the select-cable mounting member 35 is engaged, whereas the bottom face of the select-cable mounting member 35 may be formed with a guide 19.

The shift lever 5 is engaged with a hood 38 at the upper part thereof, and has a top end to which a knob 40 is connected through a ring 39. The support casing 1 is mounted to the vehicle body through mounting holes 43 formed at four corners thereof. A bolt 41, a washer 42, a collar 44, and a spacer collar 45 are used upon mounting of the support casing 1. The shift cable 25 and the select cable 34 are covered with tubes, not shown, each having an end fixed in a corresponding groove 46, 47 formed in the support casing 1 on the front side of the vehicle body through a fixture, not shown.

Figure 4:
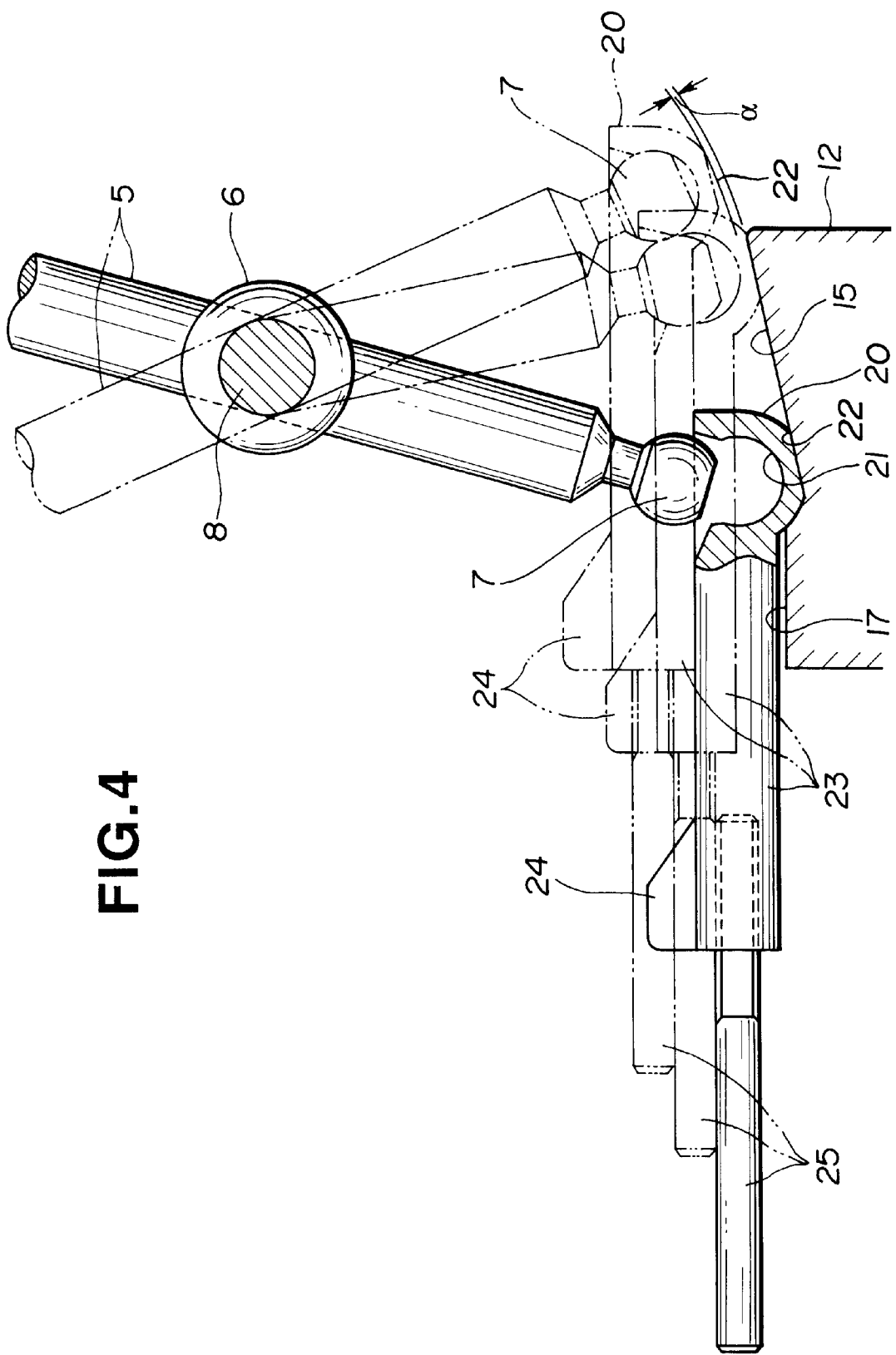
FIG. 4 is a schematic view for explaining the operation of the first embodiment.

Next, the operation of the first embodiment will be described. As for a work for engaging the shift-cable mounting member 20 of the shift cable 25 with the spherical protrusion 7 of the shift lever 5, with one end of the shift cable 25 being not connected to the transmission, another end of the tube for covering the shift cable 25 is fixed in the groove 46 of the support casing 1 through the fixture. Referring to FIG. 4, the shift-cable mounting member 20 is put in a valley defined by the slope 15 and the inclined plane 16 by manually holding the lug 24 of the shift-cable mounting member 20, whereas the wire end 23 is put on the flat plane 17. When the guide rail 18 is formed on the slope 15, it is adjusted to the guide 19 formed on the bottom face of the shift-cable mounting member 20.

Figure 5:
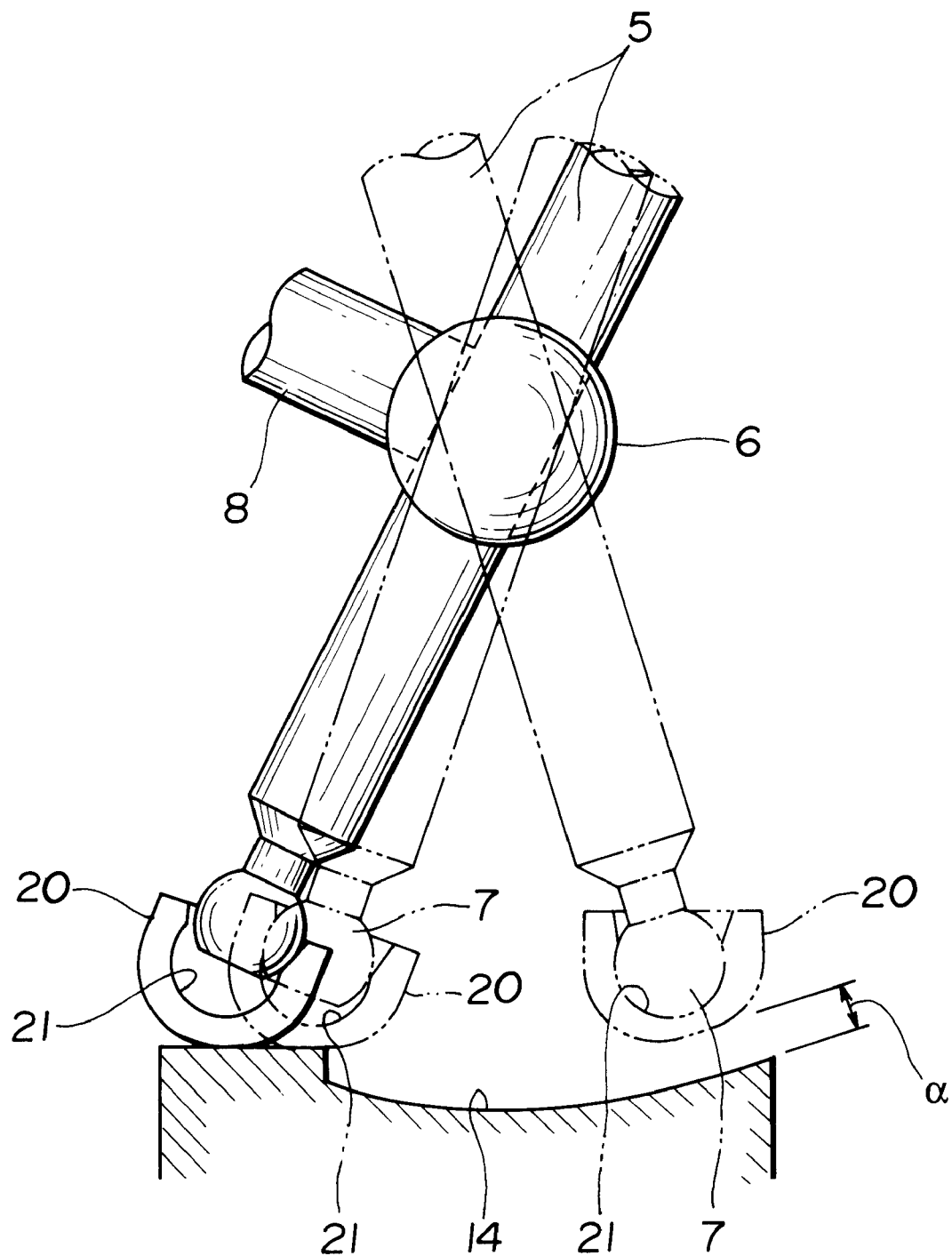
FIG. 5 is a view similar to FIG. 4, for explaining the operation of the first embodiment.

The shift lever 5 is inclined to the rear side of the vehicle boy as indicated in the fully-drawn line in FIG. 4, then to the left as indicated in the fully-drawn line in FIG. 5 so that the spherical protrusion 7 corresponds to the spherical recess 21. Subsequently, the shift lever 5 is inclined to the front side of the vehicle body as indicated by the two-dot chain line so that the shift-cable mounting member 20 is dragged by the spherical protrusion 7 of the shift lever 5 to move up the slope 15. By this, the shift-cable mounting member 20 approaches the spherical protrusion 7 thus engaged with the spherical recess 21. Referring to FIG. 5, after engaging the spherical protrusion 7 with the spherical recess 21, a predetermined clearance $\alpha$ is kept between the bottom face of the shift-cable mounting member 20 and the slope 15.

Figure 6:
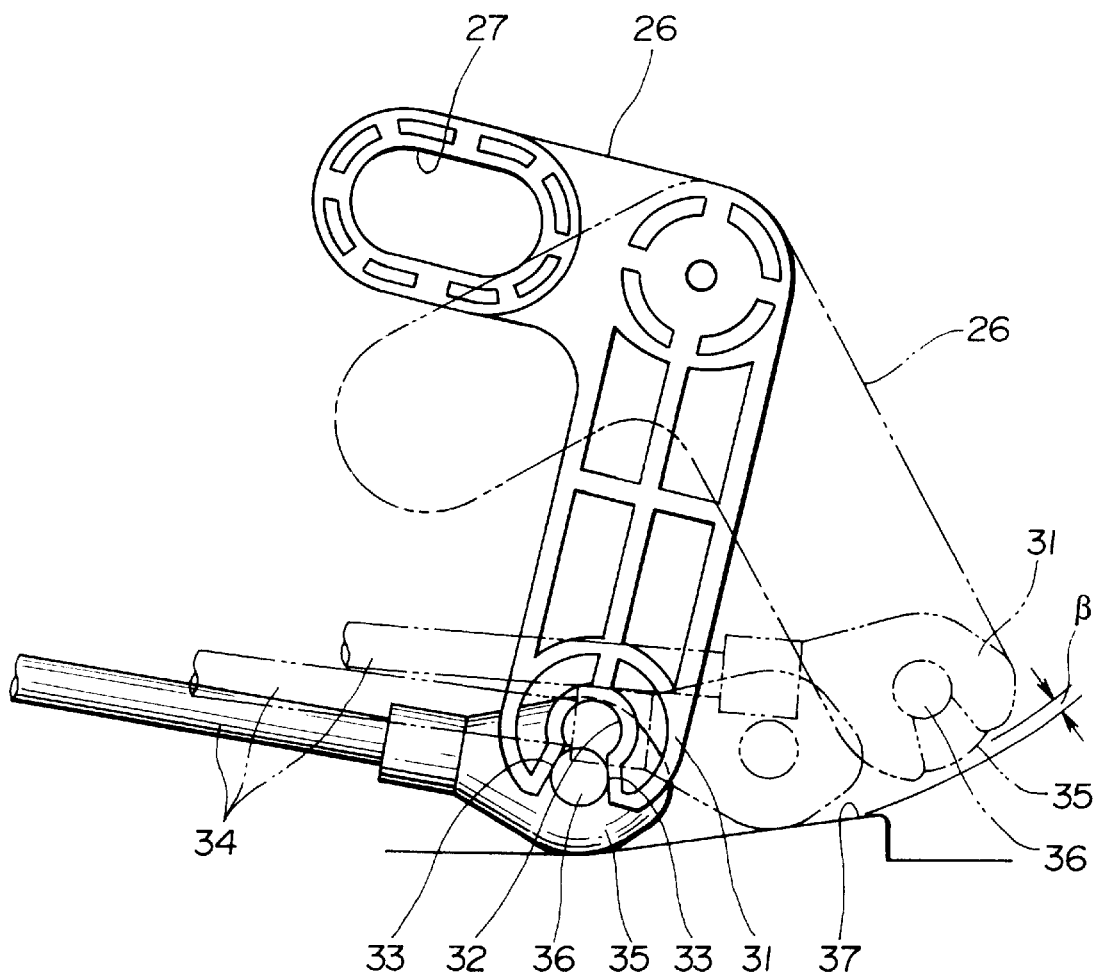
FIG. 6 is a view similar to FIG. 5, for explaining the operation of the first embodiment.

Referring to FIG. 6, when connecting the select-cable mounting member 35 of the select cable 34 to the bracket 31 of the bell crank 26, the shaft 36 of the select-cable mounting member 35 is engaged with the angular indentation 33 of the bracket 31 to position the select-cable mounting member 35 at the initial end of the slope 37. Then, the shift lever 5 is inclined to the left side of the vehicle body to slide the select-cable mounting member 35 on the slope 37. The shaft 36 is thus guided by the angular indentation 33 to press fit into the center hole 32 of the bracket 31. After engaging the shaft 36 with the center hole 32, a predetermined clearance β is kept between the bottom face of the select-cable mounting member 35 and the slope 37.

Figure 7:
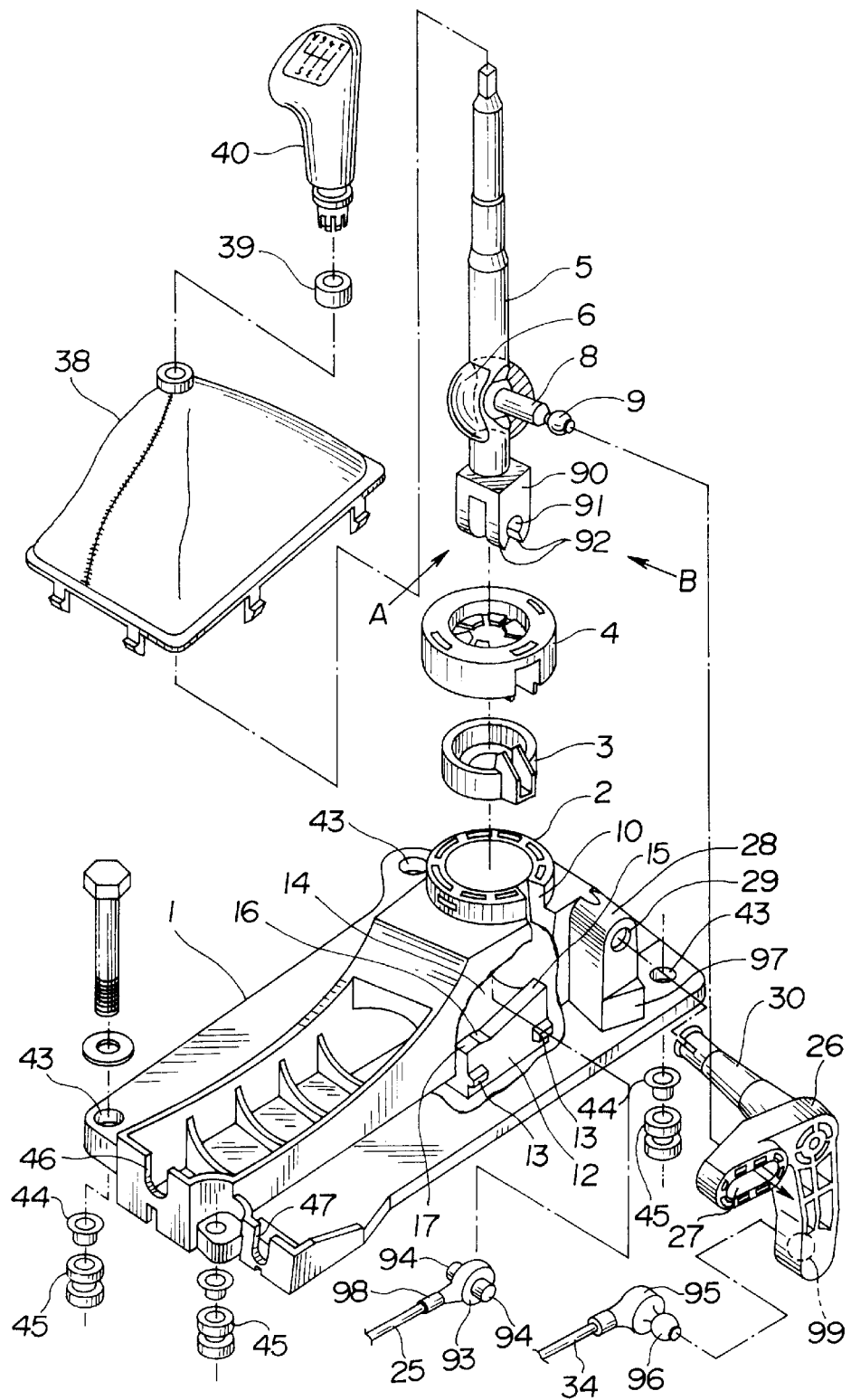
FIG. 7 is a view similar to FIG. 1, showing a second embodiment of the present invention.

FIGS. 7–9B show a second embodiment of the present invention wherein a bracket 90 having C-shape as viewed from an arrow A in FIG. 7 is formed to the shift lever 5 at the lower end thereof. The bracket 90 is formed with a center hole 91, and an angular indentation 92 thereunder having substantially wedge shape as viewed from an arrow B in FIG. 7. Moreover, a spherical recess 99 is formed through another end of the bell crank 26, and a shaft 94 is arranged through a select-cable mounting member 93 of the shift cable 25 in the center thereof to protrude in the cross direction, and a spherical protrusion 96 is formed to a select-cable mounting member 95 of the select cable 34.

Figure 8:
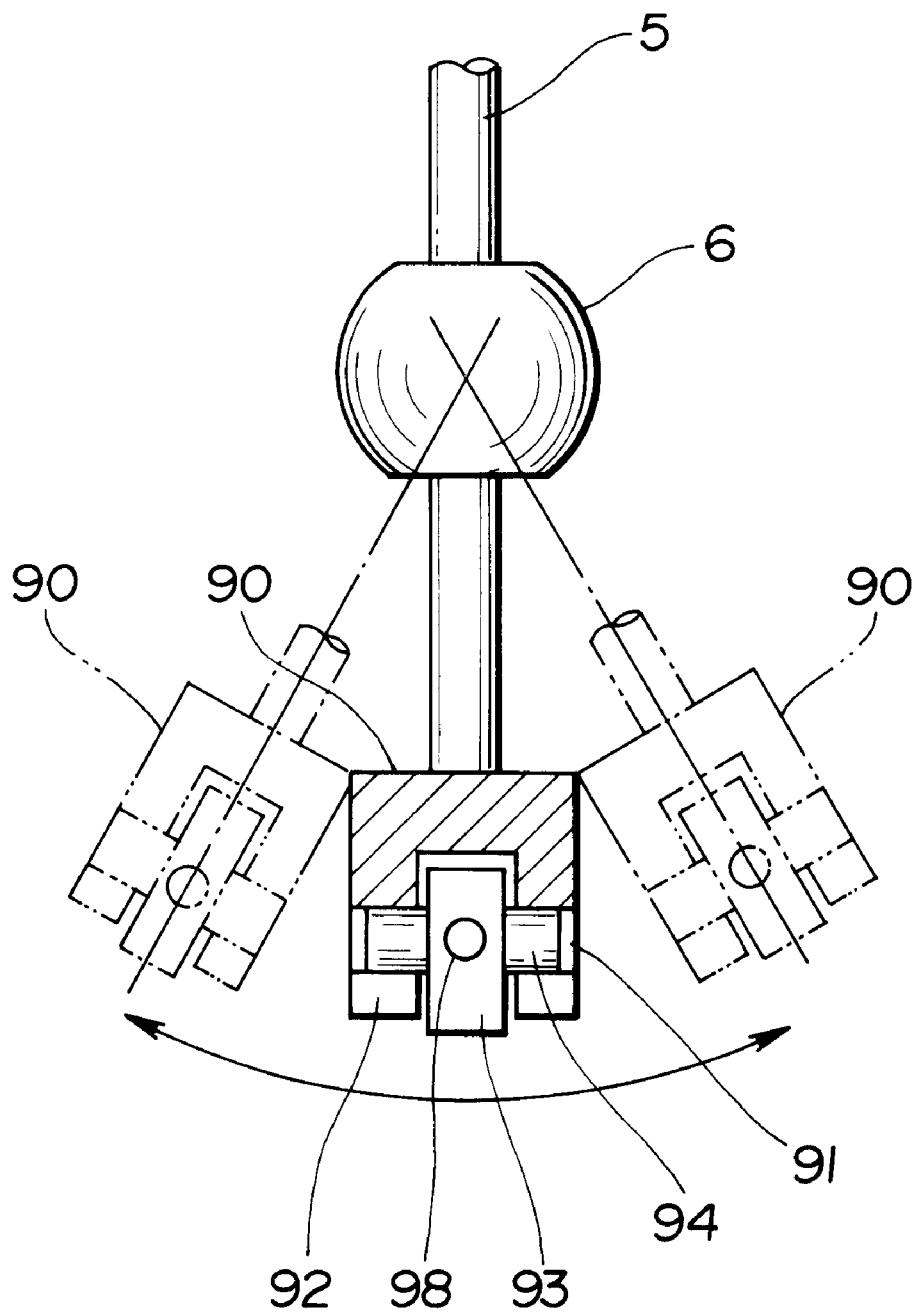
FIG. 8 is a view similar to FIG. 6, for explaining the operation of the second embodiment.

The slope 15 is formed to the support casing 1 in the same way as in the first embodiment. Moreover, a slope 97 having a wider end on the rear side of the vehicle body is formed to the support portion 28 of the support casing 1 at the front wall thereof. The slope 97 serves to engage the spherical protrusion 96 of the select-cable mounting member 95 with the spherical recess 99 of the bell crank 26. Referring to FIG. 8, in order to prevent the shift cable 25 from twisting when the shift lever 5 is inclined to right and left, a wire end 98 is connected to the shift-cable mounting member 93 to be rotatable about an axis thereof.

The method of connecting the shift-cable mounting member 93 of the shift cable 25 to the bracket 90 is the same as that of connecting the select-cable mounting member 35 to the bracket 31 as described in the first embodiment.

Figure 9A:
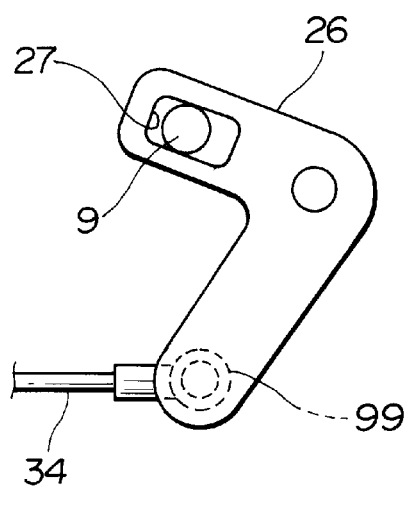
FIGS. 9A and 9B are views similar to FIG. 8, each for explaining the operation of the second embodiment.
Figure 9A:
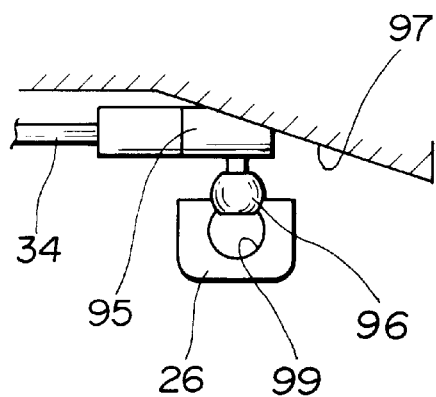

When connecting the select-cable mounting member 95 of the select cable 34 to the bell crank 26, the shift lever 5 is inclined to the right side of the vehicle body so that the spherical protrusion 9 of the cross lever 8 is rotated to the front side of the vehicle body about the shaft 30 of the bell crank 26 as shown in FIG. 9A. In this state, the spherical recess 99 of the bell crank 26 is positioned at the initial end of the slope 97, whereas the select-cable mounting member 95 is positioned at the initial end of the slope 97 so that the spherical protrusion 96 faces the spherical recess 99.

Figure 9B:
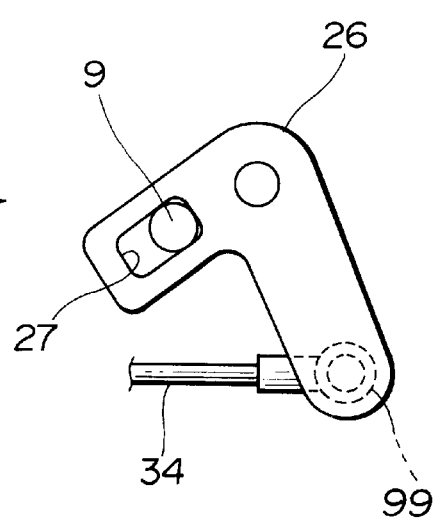
Figure 9B:
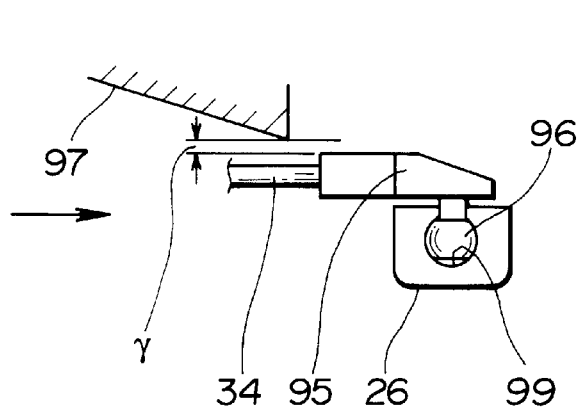

Then, the shift lever 5 is inclined to the left side of the vehicle body to rotate the lower end of the bell crank 26 to the rear side of the vehicle body as shown in FIG. 9B. By this, the spherical protrusion 96 is dragged by the spherical recess 99 to move the select-cable mounting member 95 on the slope 97, so that the select-cable mounting member 95 approaches the lower end of the bell crank 26, engaging the spherical protrusion 96 with the spherical recess 93. After engaging the spherical protrusion 96 with the spherical recess 93, a predetermined clearance γ is kept between the slope 97 and the side of the select-cable mounting member 95.

Figure 10:
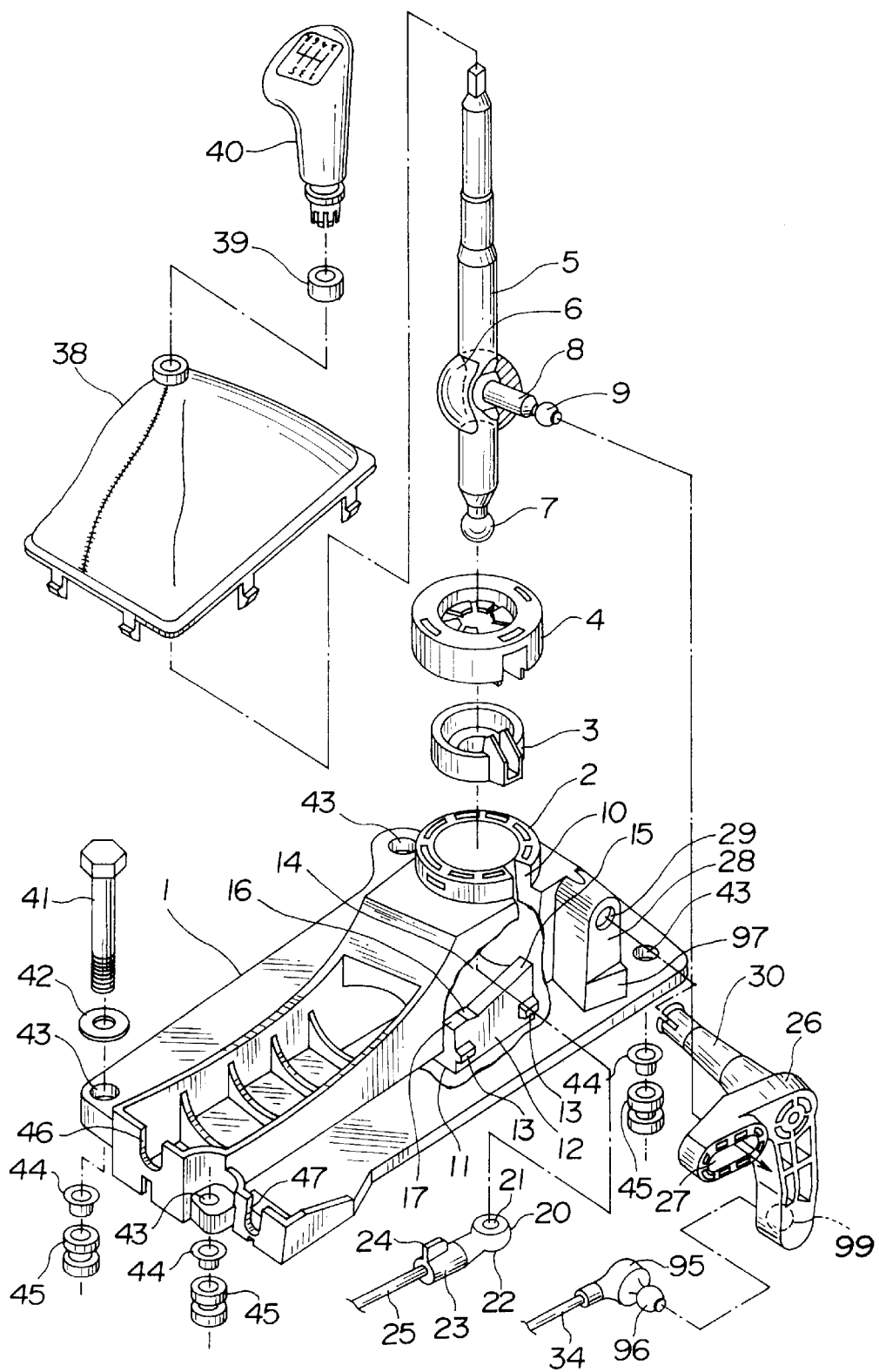
FIG. 10 is a view similar to FIG. 7, showing a third embodiment of the present invention.

FIG. 10 shows a third embodiment of the present invention. The third embodiment comprises the spherical protrusion 7 at the lower end of the shift lever 5, and the spherical recess 99 at the lower end of the bell crank 26. The third embodiment also comprises the shift-cable mounting member 20 of the shift cable 25 having the spherical recess 21, the select-cable mounting member 95 of the select cable 34 having the spherical protrusion 96, and the slope 97 at the bearing 97 of the support casing 1.

Figure 11:
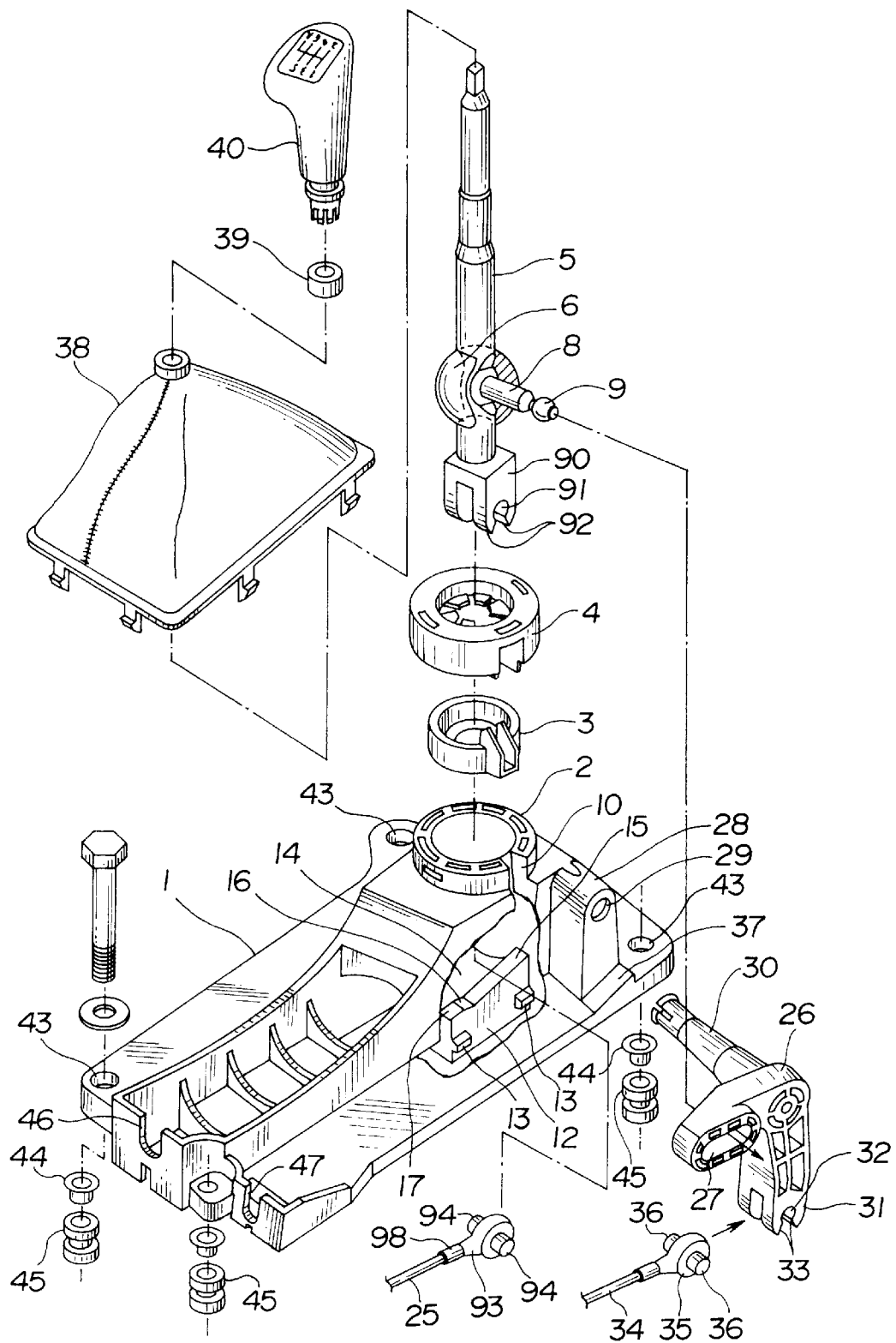
FIG. 11 is a view similar to FIG. 10, showing a fourth embodiment of the present invention.

FIG. 11 shows a fourth embodiment of the present invention. The fourth embodiment comprises the brackets 90, 31 at the lower ends of the shift lever 5 and the bell crank 26, the shift-cable and select-cable mounting members 93, 35 of the shift and select cables 25, 34 having the shafts 36, 94, and the slope 37 at the support portion 28 of the support casing 1.

Thus, connection of the shift lever 5 to the select cable 25, 34 can easily and quickly be carried out without any tool, but by simply inclining the shift lever 5.

Figure 12:
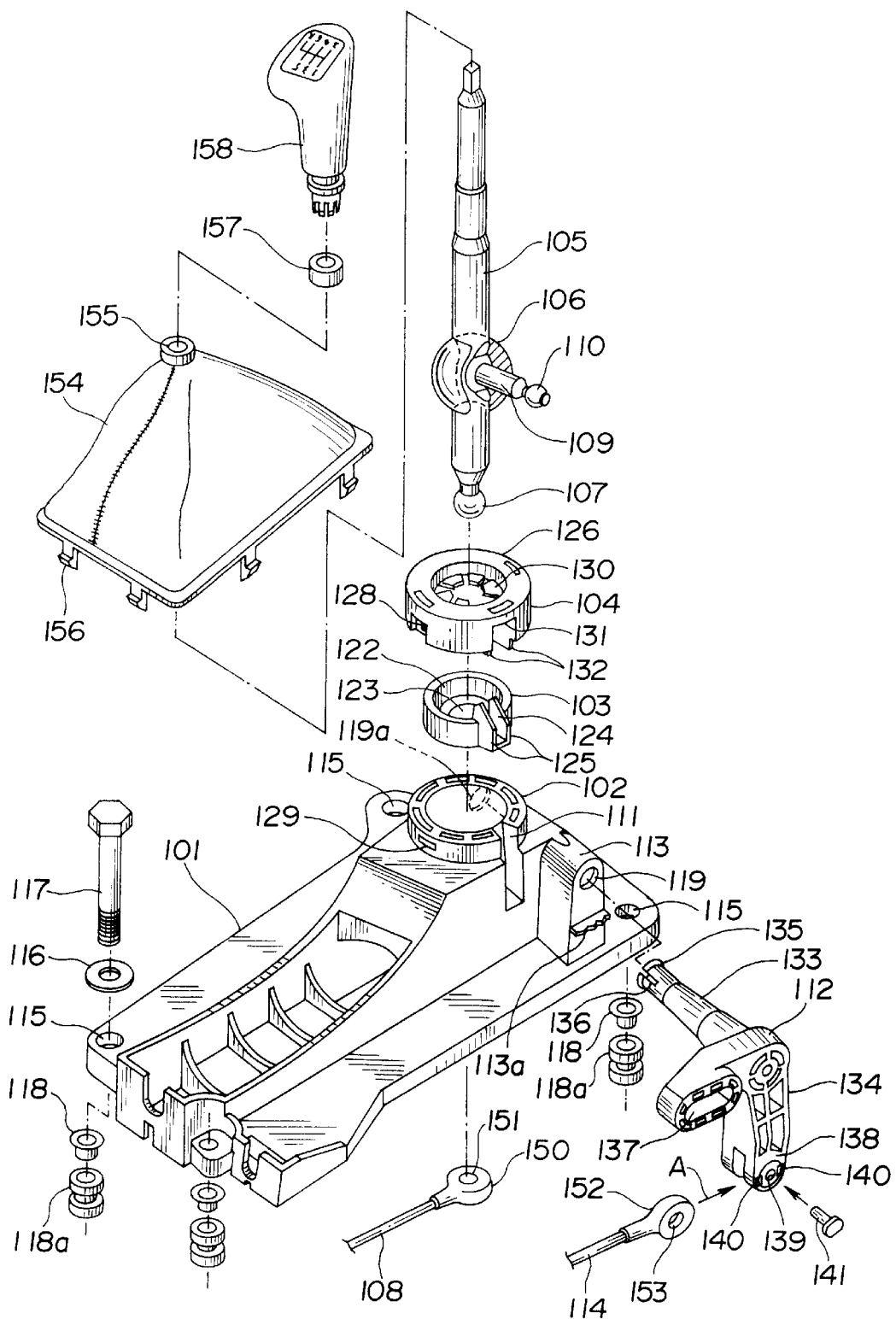
FIG. 12 is a view similar to FIG. 11, showing a fifth embodiment of the present invention.

FIGS. 12–16C show a fifth embodiment of the present invention. Referring to FIG. 12, an operating lever comprising a shift lever 105 and a bell crank 112, which serves as a select lever, is swingably supported to a support casing 101, which is adapted to be fixed to the vehicle body. The shift lever 105 comprises a spherical portion 106 supported to a bearing 102 of the support casing 101 through a lower bearing 103 and an upper bearing 104 so as to be swingable in the direction of 360°. The shift lever 105 has a lower end formed with a spherical protrusion 107 to which a shift cable 108 is connected in the support casing 101.

Figure 14:
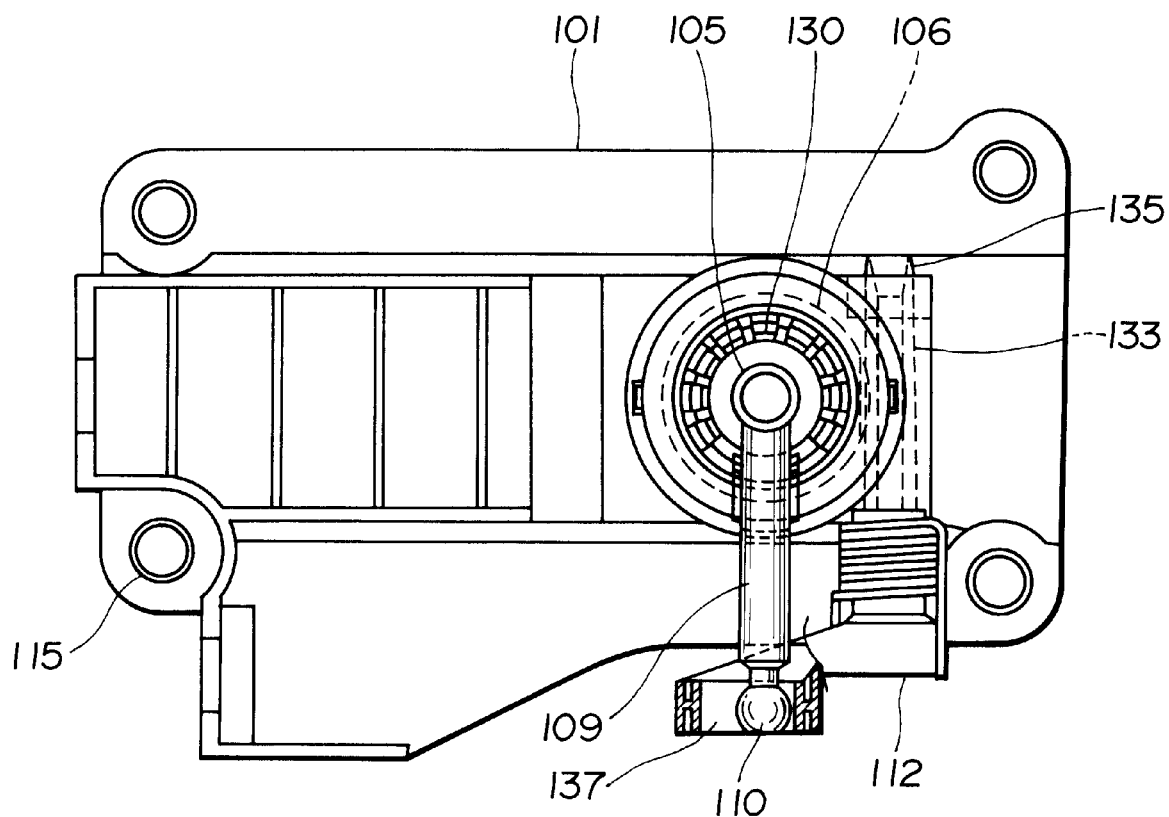
FIG. 14 is a partly sectional plan view showing the operating lever mounted to the support casing.

Referring also to FIG. 14, a cross lever 109 is perpendicularly mounted to the shift lever 105 to protrude from the spherical portion 106. The cross lever 109 protrudes from an opening 111 of the bearing 102 of the support casing 101, and has an end formed with a spherical protrusion 110. The spherical protrusion 110 is engaged with one end of the bell crank 112, which is rotatably supported to a support portion 113 formed beside the bearing 102. The bell crank 112 has another end connected to a select cable 114.

The support casing 101 made of a synthetic resin is mounted to the vehicle body through mounting holes 115 formed at four corners thereof. A bolt 117, a washer 116, a collar 118, and a spacer collar 118a are used upon mounting of the support casing 101. The lower and upper bearings 103, 104 are formed with recesses 124, 131 corresponding to the opening 111 of the bearing 102, and pairs of protrusions 125, 132 arranged on both sides of the recesses 124, 131 to be engaged therewith.

The support portion 113 is formed with a hole 119 for receiving a shaft 133 of the bell crank 112. The shaft 133 has one end formed with a pawl 135, which is engaged with a hole 119a formed in the support casing 101 on the other side thereof. A wavelike protrusion 113a is formed to the support portion 113 on the side thereof to be positioned on the circumference of a circle with center at the hole 119 and a predetermined radius. Referring also to FIGS. 15B and 15C, the wavelike protrusion 113a has a wavelike portion with which a spherical portion 145 of a check member 144 of the crank lever 112 comes in slide contact, producing a sense of moderation for swing motion of the crank lever 112.

Figure 13:
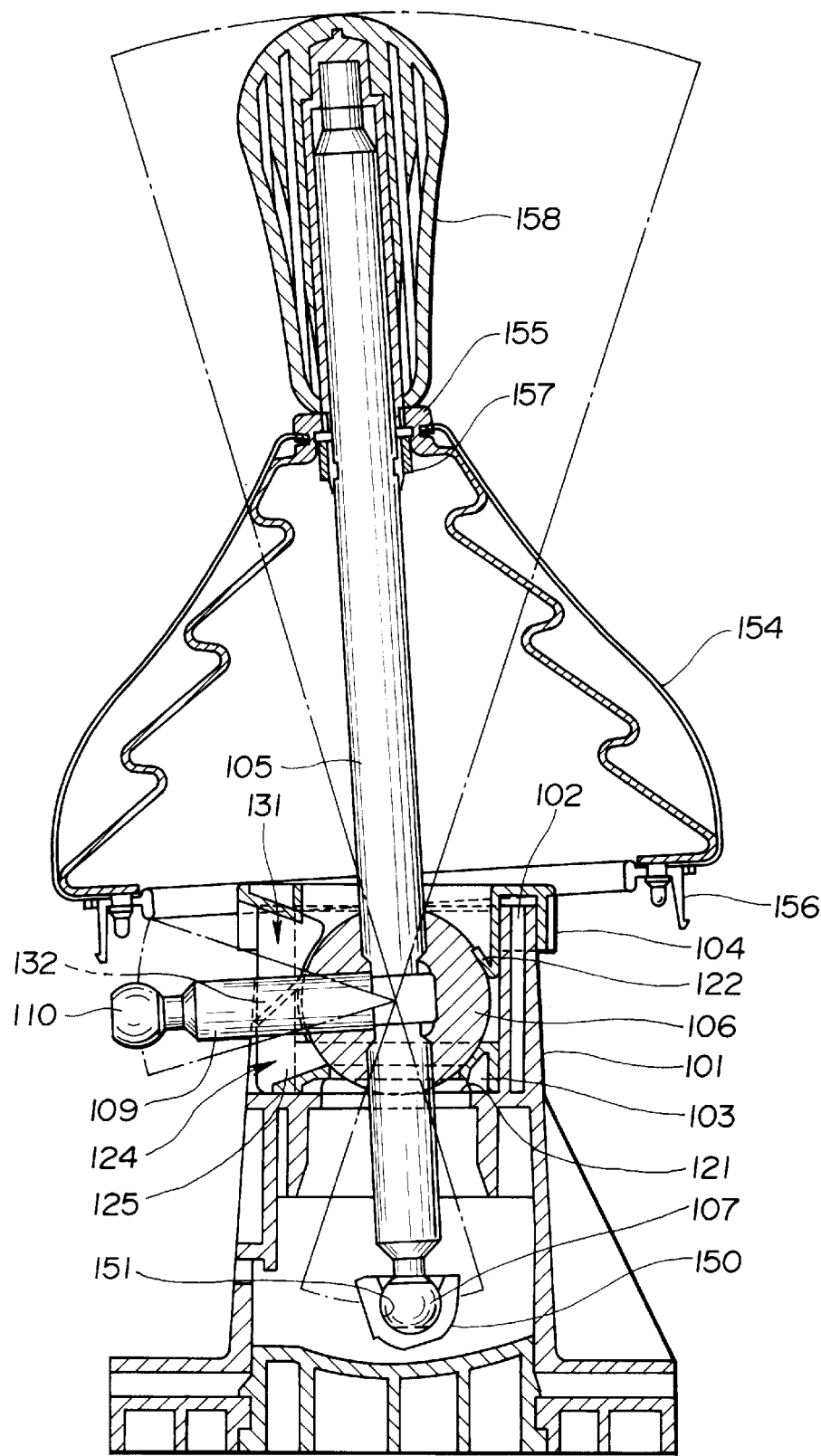
FIG. 13 is a cross section showing an operating lever mounted to the support casing.
Figure 16A:
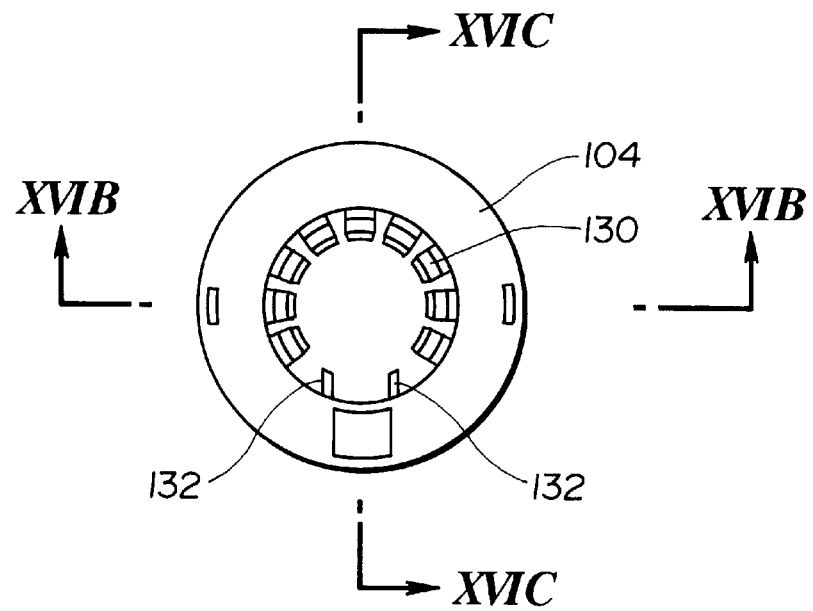
FIG. 16A is a plan view showing an upper bearing.
Figure 16B:
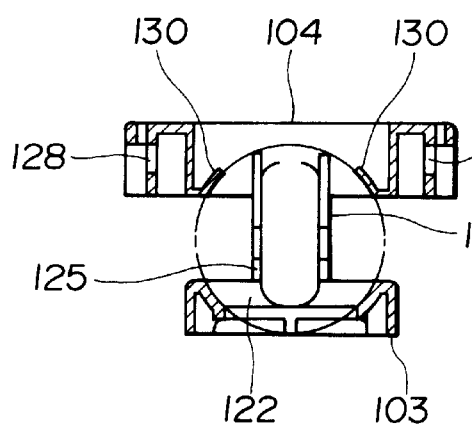
FIG. 16B is a view similar to FIG. 15C, taken along the line XVIB—XVIB in FIG. 16A.
Figure 16C:
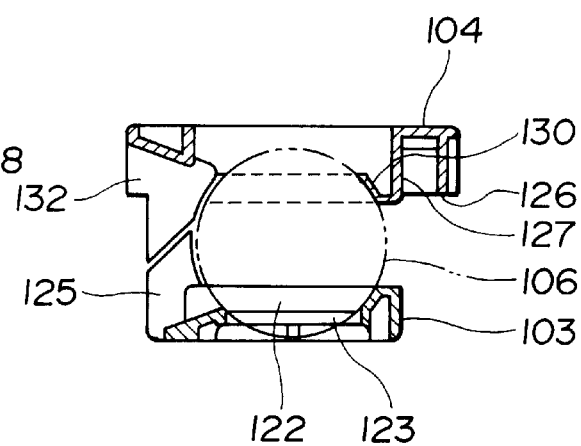
FIG. 16C is a view similar to FIG. 16B, taken along the line XVIC—XVIC in FIG. 16A.

Referring also to FIG. 13, the lower bearing 103 is in the form of a cylinder fitted in the bearing 102 and supported by an inner bottom 121 thereof. Referring also to FIGS. 16B and 16C, the lower bearing 103 has on the inner bottom face a bearing 122 curved downwardly to support the lower part of the spherical portion 106. The bearing 122 has in the center a through hole 123 to receive the shift lever 105, and on the side the recess 124 that corresponds to the opening 111 of the bearing 102. The recess 124 has side walls or guide protrusions 125 that protrude radially and upwardly by predetermined amounts.

The upper bearing 104 is in the form of a cylinder having outer and inner cylindrical portions 126, 127 formed like inverted U-shape in cross section. The outer cylindrical portion 126 is formed with recesses 128 that diametrically face each other, each being engaged with a protrusion 129 arranged to the bearing 102 on the side thereof as shown in FIG. 12. Referring also to FIG. 16A, a bearing or presser bar spring 130 of the inner cylindrical portion 127, which comprises circumferential divisions, is curved to be able to contact the upper part of the spherical portion 106. The presser bar spring 130 is bent to press and hold the spherical portion 106. The recess 131 is formed through the side of the upper bearing 104 so as to correspond to the opening 111 of the bearing 102. The recess 131 has side walls or guide protrusions 132 that protrude radially and downwardly by predetermined amounts. The upper bearing 104 is integrally made of a resilient synthetic resin.

The guide protrusions 125, 132 of the lower and upper bearings 103, 104 arranged to correspond to the opening 111 of the bearing 102 of the support casing 101 serve as not only anti-rotation of the bearing 102 of the lower and upper bearings 103, 104, but a guide upon assembling, resulting in a reduction in engagement error. Further, the guide protrusions 125, 132 are formed in substantially C-shape, having high rigidity, resulting in less breakage of the bearing 102 by swing motion of the cross lever 109. Furthermore, due to the general use of an additive such as glass fiber to avoid a disadvantage in view of the strength, the slide resistance is greater at the opening 111 of the support casing 101 that contacts the cross lever 109. However, according to the fifth embodiment, since the opening 111 is enclosed by the guide protrusions 125, 132 of the lower and upper bearing 103, 104 made of a lubricative synthetic resin, the slide resistance is smaller at the opening 111.

Figure 15A:
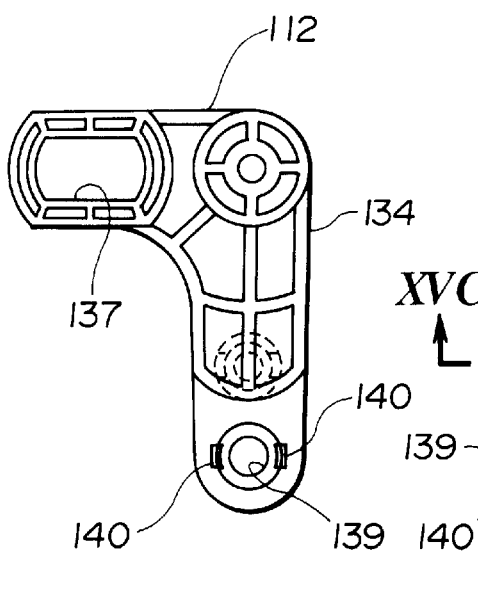
FIG. 15A is a front view showing a bell crank.
Figure 15B:
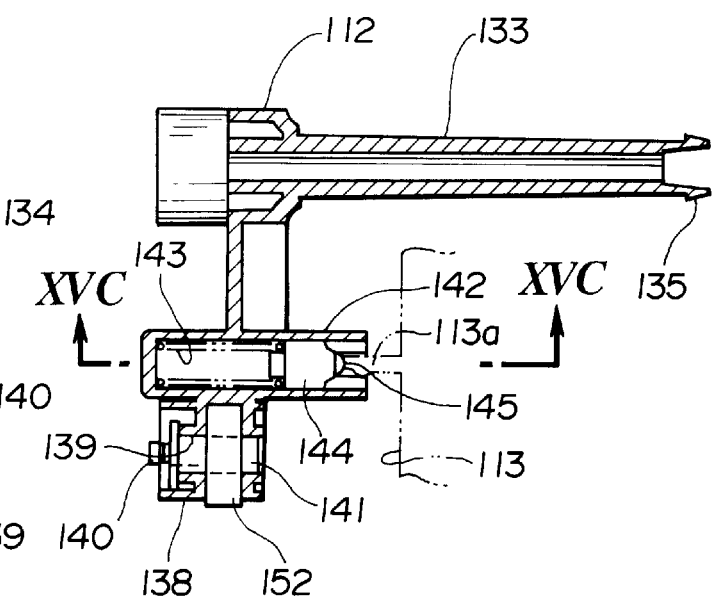
FIG. 15B is a longitudinal section showing the bell crank.
Figure 15C:
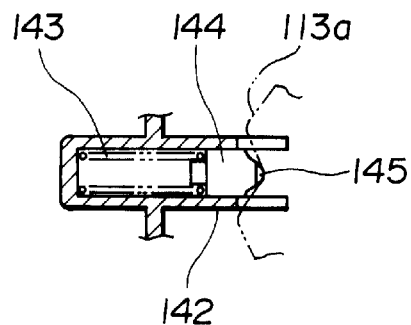
FIG. 15C is a sectional view taken along the line XVC—XVC in FIG. 15B.

Referring to FIGS. 15A and 15B, the bell crank 112 comprises the shaft 133 and an inverted L-shaped main body, 134 which are integrally made of a synthetic resin. The end of the shaft 133 is formed with the pawl 135, and expanding slots 136 arranged at predetermined intervals in the circumferential direction to extend axially. When engaged with the hole 119a to outwardly protrude from the side of the support casing 101, the pawl 135 catches the outer peripheral edge of the hole 119a, serving as an anti-loose member. Formed in a short-side part of the main body 134 is a long hole 137 with which the spherical protrusion 109 of the shift lever 105 is engaged.

A bracket 138 having inverted U-shape as viewed from an arrow A in FIG. 12 is formed in a long-side part of the main body 134 at the lower end thereof. The bracket 138 is formed with a through hole 139, and pawls 140 at the periphery thereof to diametrically face each other. Each pawl 140 is in the form of a hook to contact the head of a pin 141 when inserted in the through hole 139, serving as an anti-loose member.

Moreover, a cylindrical portion 142 is formed in the long-side part of the main body 134 substantially in the center thereof. The check member 144 biased by a spring 143 is movably arranged therein, and is formed with a spherical portion 145 on the side of an open end of the cylindrical portion 142. The spherical portion 145 comes in slide contact with the wavelike protrusion 113a of the support portion 113. That is, the check member 144 serves to produce a sense of moderation upon rotation of the bell crank 112 through the spherical portion 145 coming in slide contact with the side of the support portion 113.

The shift cable 108 has an end to which a shift-cable mounting member 150 is connected. The shift-cable mounting member 150 is formed with a spherical recess 151 engaged with the spherical protrusion 107 of the shift lever 105. On the other hand, the select cable 114 has an end to which a select-cable mounting member 152 is connected. The select-cable mounting member 152 has a disk-like main body engaged with the bracket 138 of the bell crank 112, which is formed with a through hole 153 for receiving the pin 141.

Referring to FIG. 13, the shift lever 105 mounted to the support casing 101 is engaged with a hood 154 through a cylindrical portion 155 located in the center thereof. The hood 154 is formed with a pawl 156 engaged with a console, not shown, of the vehicle body. Moreover, the shift lever 105 has a top end to which a knob 158 is connected through a joint 157.

According to the fifth embodiment, the operating lever device can fundamentally be constructed by only five parts, i.e., the support casing 101, the shift lever 105, the lower bearing 103, the upper bearing 104, and the bell crank 112, and it can be thus assembled in a very short time. After engaging the lower bearing 103 with the bearing 102 of the support casing 101, the shift lever 105 is inserted therein to have the spherical portion 106 supported by the lower bearing 103, and the upper bearing 104 is engaged with the bearing 102 to have the spherical portion 106 supported by the bearing 102 with an appropriate tightening force. The shaft 133 of the bell crank 112 is inserted in the opening 119 of the support portion 113 of the support casing 101. The spherical protrusion 107 of the shift lever 105 is engaged with the spherical recess 151 of the shift-cable mounting member 150, and the bracket 138 of the bell crank 112 is engaged with the select-cable mounting member 152 through the pin 141. Moreover, since the above structure of the operating lever device with the cross lever 109 is also applicable to the operating lever device with no cross lever 109, the same parts can be used in both operating lever devices.

Having described the present invention in connection with the preferred embodiments, it is noted that the present invention is not limited thereto, and various changes and modifications can be made without departing from the spirit of the present invention.

By way of example, the spherical recesses 21, 99 and spherical protrusions 7, 96 of the shift lever 5 and the mounting members 20, 35, 93, 95 may be replaced with each other. Further, for engagement of the shift cable 25 with the shift lever 5, the shift lever 5 may be inclined to either of the front and rear sides of the vehicle body. Furthermore, the slopes 15, 37, 97 may have a higher end on either of the front and rear sides of the vehicle body. Still further, the shift and select levers 5, 26 may be constructed such that only one thereof is engaged through the slopes 15, 37, 97. Further, the shift and select cables 25, 34 may be replaced with shift and select rods.

What is claimed is:

1. An operating lever device for a manual transmission of a motor vehicle, comprising:
   a casing adapted to be fixed to the vehicle;
   a lever swingably supported to said casing and adapted for connection to the manual transmission, said lever having a lower end;
   a mounting member engageable with said lower end; and
   a block positioned within said casing, said block having a sloped section and a linear member formed with the sloped section, said linear member being engageable with said mounting member to linearly guide said mounting member.

2. An operating lever device as claimed in claim 1, wherein said lever includes a shift lever and a select lever.

3. An operating lever device as claimed in claim 2, wherein said select lever has a lower end formed with a bracket, said bracket having an end formed with a hole.

4. An operating lever device as claimed in claim 3, wherein said mounting member includes a shaft engaged with said hole of said bracket.

5. An operating lever device as claimed in claim 2, wherein said shift lever has said lower end, said lower end being formed with a bracket having an end formed with a hole.

6. An operating lever device as claimed in claim 2, further comprising:

a spherical portion formed on said shift lever;

a bearing portion mounted to said casing, said bearing portion having a side formed with a recess;

a first bearing engaged with said bearing portion, said first bearing serving to rotatably support said spherical portion of said shift lever, said first bearing having a side formed with a recess;

a second bearing mounted to said bearing portion, said second bearing serving to rotatably press said spherical portion of said shift lever, said second bearing having a side formed with a recess, wherein said recesses of said bearing portion, said first bearing, and said second bearing are complementary to each other; and a cross lever mounted to said shift lever, said cross lever extending through said recesses of said first and second bearings and engaging said select lever.

7. An operating lever device as claimed in claim 6, wherein said bearing portion has a protrusion formed on an outer peripheral face thereof and said second bearing includes inner and outer cylindrical portions, said inner cylindrical portion having a curved inner edge formed with circumferential divisions that contact an upper part of said spherical portion of said shift lever, said outer cylindrical portion being formed with a recess engaging said protrusion.

8. An operating lever device as claimed in claim 6, wherein said first and second bearings include radial protrusions arranged on side walls of said recesses, said radial protrusions engaging said recess of said bearing portion.

9. An operating lever device as claimed in claim 1, wherein said sloped section is adapted to be inclined in a fore and aft direction of the vehicle.

10. An operating lever device as claimed in claim 9, wherein said sloped section is formed with an inner bottom face of said casing.

11. An operating lever device as claimed in claim 10, wherein said sloped section is formed at one side of said casing.

12. An operating lever device as claimed in claim 11, wherein said linear member is a guide rail.

13. An operating lever device as claimed in claim 12, wherein said mounting member includes a guide portion engaged with said guide rail.

* * * * *